United States Patent
Ortiz

(10) Patent No.: US 7,748,470 B2
(45) Date of Patent: Jul. 6, 2010

(54) COMBINATION GARDEN TILLER AND SPRINKLER HEAD GRASS TRIMMER

(76) Inventor: George A. Ortiz, 14578 San Cristabal Dr., La Mirada, CA (US) 90638

( * ) Notice: Subject to any disclaimer, the term of this patent is extended or adjusted under 35 U.S.C. 154(b) by 0 days.

(21) Appl. No.: 12/074,076

(22) Filed: Feb. 29, 2008

(65) Prior Publication Data

US 2008/0217033 A1 Sep. 11, 2008

Related U.S. Application Data

(62) Division of application No. 11/653,821, filed on Jan. 16, 2007, now abandoned.

(60) Provisional application No. 60/761,836, filed on Jan. 25, 2006.

(51) Int. Cl.
*A01D 43/16* (2006.01)

(52) U.S. Cl. .............. 172/13; 172/21; 172/25; 172/41; 172/378; 30/316

(58) Field of Classification Search .............. 172/772.5, 172/719, 13–15, 21, 41, 371, 373, 374, 378, 172/37, 44, 110, 25, 48, 50–52, 22; 30/51, 30/68, 349, 314–316, DIG. 7
See application file for complete search history.

(56) References Cited

U.S. PATENT DOCUMENTS

| | | | | |
|---|---|---|---|---|
| 1,857,383 A * | 5/1932 | Johnson | .................. | 30/316 |
| 2,615,246 A * | 10/1952 | Littig | .................. | 172/18 |
| 2,991,838 A * | 7/1961 | Lane | .................. | 175/220 |
| 3,062,299 A * | 11/1962 | Koepfinger | .................. | 172/18 |
| 3,064,353 A * | 11/1962 | Montgomery | .................. | 408/204 |
| 3,111,995 A * | 11/1963 | Dahl | .................. | 172/18 |
| 3,143,176 A * | 8/1964 | Drane, Jr. | .................. | 172/13 |
| 3,174,224 A * | 3/1965 | Rousselet | .................. | 30/264 |
| 3,444,934 A * | 5/1969 | Alberto | .................. | 172/25 |
| 3,554,293 A * | 1/1971 | Aman et al. | .................. | 172/13 |
| 3,555,680 A * | 1/1971 | Ford | .................. | 30/276 |
| 3,565,179 A * | 2/1971 | Paliani | .................. | 172/19 |
| 3,709,627 A * | 1/1973 | Elliott, Jr. | .................. | 408/204 |
| 3,743,027 A * | 7/1973 | Hatfield | .................. | 172/13 |
| 3,747,213 A * | 7/1973 | Green et al. | .................. | 30/279.2 |
| 3,905,103 A * | 9/1975 | Ford et al. | .................. | 30/276 |
| 4,547,966 A * | 10/1985 | Eden | .................. | 30/300 |
| 4,832,131 A * | 5/1989 | Powell et al. | .................. | 172/25 |
| 5,461,788 A * | 10/1995 | Taylor | .................. | 30/300 |

(Continued)

*Primary Examiner*—Robert E Pezzuto
*Assistant Examiner*—Matthew D Troutman
(74) *Attorney, Agent, or Firm*—Borton Petrini, LLP; Jeffrey A. Travis, Esq.

(57) ABSTRACT

Apparatus for trimming grass around sprinkler heads or tending a small garden area includes a tubular member having a plurality of serrations formed on one end for cutting grass around such sprinkler heads. A housing member partially disposed for reciprocal movement within the tubular member. A plate disposed for closing one end of housing member and having an outer periphery engageable with an inner surface of such tubular member for guiding during reciprocal movement. A second guide disposed around outer periphery of such housing member intermediate each end thereof. Another elongated rod like member engages an end of such first elongated rod like member. A caged biasing means is disposed over the second rod like member for absorbing shock during use of apparatus and a mechanism for manipulating the apparatus while trimming such grass around such sprinkler head or tending such small garden area.

7 Claims, 2 Drawing Sheets

U.S. PATENT DOCUMENTS

| | | | |
|---|---|---|---|
| 5,988,292 A | 11/1999 | Knotts | |
| 6,134,789 A * | 10/2000 | Strickland | 30/276 |
| 6,340,061 B2 | 1/2002 | Marshall et al. | |
| 6,412,568 B1 * | 7/2002 | Thede | 172/13 |
| 6,578,272 B2 * | 6/2003 | Arbanas | 30/316 |
| 6,722,444 B2 | 4/2004 | McKill | |
| 6,939,092 B2 * | 9/2005 | Korb et al. | 408/206 |
| D541,606 S * | 5/2007 | Griffin et al. | D8/1 |
| 2003/0070302 A1 * | 4/2003 | Arbanas | 30/316 |
| 2005/0039583 A1 * | 2/2005 | McNulty | 83/13 |

* cited by examiner

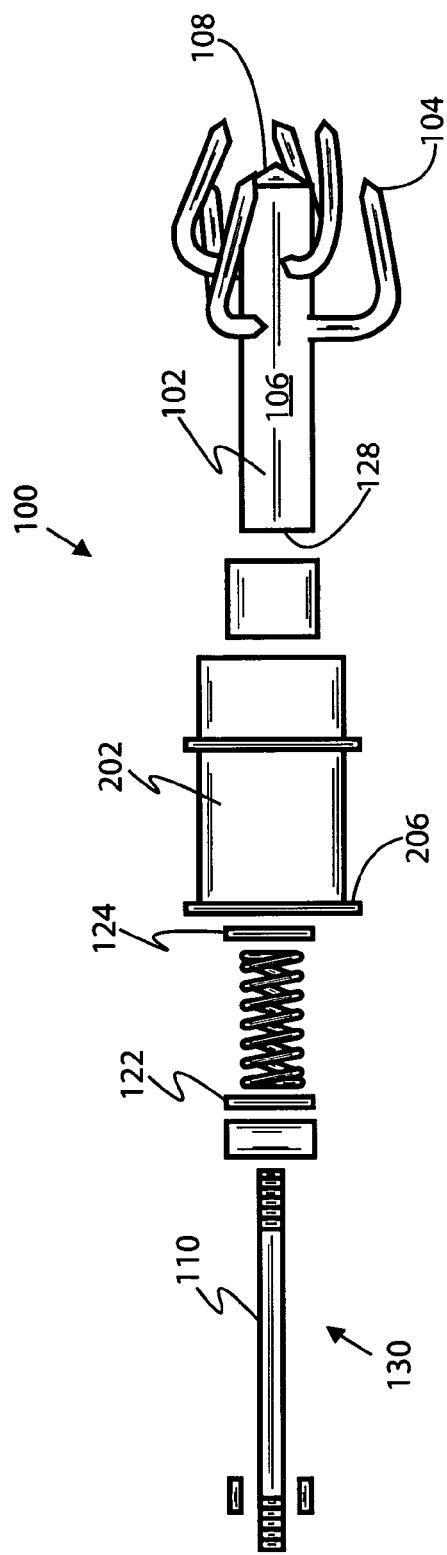
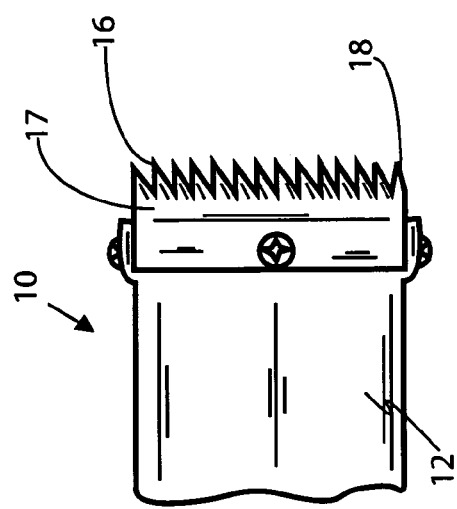
FIG. 2
FIG. 4

COMBINATION GARDEN TILLER AND SPRINKLER HEAD GRASS TRIMMER

CROSS REFERENCE TO RELATED APPLICATION

This application is a Divisional Application and claims priority from patent application Ser. No. 11/653,821 filed Jan. 16, 2007 now abandoned.

This patent application is related to and claims benefit of priority from U.S. Provisional Patent Application Ser. No. 60/761,836 filed Jan. 25, 2006.

FIELD OF THE INVENTION

The present invention relates, in general, to lawn and garden type equipment and, more particularly, this invention relates to a combination turbo garden tiller and a grass trimmer for trimming the grass around the head of a lawn water sprinkler.

BACKGROUND OF THE INVENTION

Prior to the conception and development of the present invention, as is generally well known in the prior art, garden tillers and grass trimmers have been sold commercially and are generally in widespread use.

The numerous prior art type garden tillers, which are known to Applicant, are normally rather large and are, therefore, usually not used for small jobs such as tending a small flower garden. Additionally, the prior art type grass trimmers are not specifically designed to trim a circle as is needed around the head of a lawn water sprinkler. Furthermore, to the best of Applicant's knowledge, there is not a single implement presently available on the market which can be readily adapted to do each of these jobs in an efficient manner.

SUMMARY OF THE INVENTION

The present invention provides, in a first aspect, a grass trimmer for trimming the grass from around the head of a lawn water sprinkler system. The grass trimmer includes an elongated generally hollow tubular member closed at a first end thereof. Such elongated tubular member having each of a predetermined length and a predetermined diameter. There is a plurality of serrations formed on a second axially opposed end of the elongated generally hollow tubular member for cutting grass disposed around such head portion of such lawn water sprinkler. Additionally, a means engageable with the first closed end of such elongated generally hollow tubular member is provided for manipulating such apparatus for trimming such grass from around such head portion of such lawn water sprinkler system.

In a second aspect, the present invention provides a relatively small garden tiller for at least one of tending, tilling and cultivating the ground around a small garden area to remove unwanted vegetation. Such garden tiller includes a first elongated rod like member having each of a predetermined length and a first predetermined cross-sectional shape in a direction transverse to such predetermined length. A predetermined number of tine members are secured to an outer surface of the elongated rod like member adjacent a first end thereof for penetrating a ground surface in order to at least one of till, weed and cultivate a small garden area. A second elongated rod like member engageable at a first end thereof with a second axially opposed end of said first elongated rod like member is provided. A biasing means is disposed over such second elongated rod like member and caged between a pair of plate like members for absorbing shock during use of the apparatus and a means engageable with a second end of such second elongated rod like member is provided for manipulating such apparatus during such at least one of tilling, weeding and cultivating a small garden area.

The instant invention, in a third and final aspect, provides a combination garden tiller and grass trimmer for at least one of trimming around a lawn water sprinkler head and at least one of tilling, weeding and cultivating a small garden area. This combination garden tiller and grass trimmer for trimming around a lawn water sprinkler head includes an elongated generally hollow tubular member closed at a first end thereof. Such elongated tubular member having each of a predetermined length and a predetermined diameter. A plurality of serrations are formed on a second axially opposed end of the elongated generally hollow tubular member for cutting grass disposed around such head portion of such lawn water sprinkler. An elongated generally hollow housing member at least partially disposed for reciprocal movement within such elongated generally hollow tubular member. The elongated generally hollow housing member being open at a first end thereof and having each of a predetermined length and a predetermined cross-sectional shape in a direction transverse to such predetermined length. A plate like means is disposed at a second end of the axially opposed second end of such elongated generally hollow housing member for closing such second end of the elongated generally hollow housing member and having an outer periphery thereof engageable with an inner surface of such elongated generally hollow tubular member for providing a first portion of a guide means during such reciprocal movement. A second portion of the guide means is disposed around an outer periphery of the elongated generally hollow housing member intermediate each end thereof and having an outer periphery engageable with the inner surface of such elongated generally hollow tubular member for providing a first portion of the guide means during such reciprocal movement. A first elongated rod like member having each of a predetermined length and a first predetermined cross-sectional shape in a direction transverse to said predetermined length is provided to receive a predetermined number of tine members secured to an outer surface thereof adjacent a first end for penetrating a ground surface to at least one of till, weed and cultivate a small garden area. A second elongated rod like member engages at a first end thereof with a second axially opposed end of the first elongated rod like member. A biasing means is disposed over such second elongated rod like member and caged between a pair of plate like members for absorbing shock during use of such apparatus. There is a means engageable with one of such first closed end of the elongated generally hollow tubular member and such second end of such elongated rod like member for manipulating such apparatus for at least one of trimming such grass from around such head portion of such lawn sprinkler and at least one of tilling, weeding and cultivating a small garden area.

OBJECTS OF THE INVENTION

It is, therefore, one of the primary objects of the present invention to provide a combination garden tiller and grass trimmer for trimming grass from around the head of a lawn water sprinkler system which is easy to use.

Another object of the present invention is to provide a combination garden tiller and grass trimmer for trimming grass from around the head of a lawn water sprinkler system which is less expensive to purchase than when these two items are purchased as separate units.

Still another object of the present invention is to provide a combination garden tiller and grass trimmer for trimming grass from around the head of a lawn water sprinkler system which is relatively lightweight.

Yet another object of the present invention is to provide a combination garden tiller and grass trimmer for trimming grass from around the head of a lawn water sprinkler system which requires less storage space than presently available equipment.

A further object of the present invention is to provide a combination garden tiller and grass trimmer for trimming grass from around the head of a lawn water sprinkler system which can be power operated or manually operated.

An additional object of the present invention is to provide a combination garden tiller and grass trimmer for trimming grass from around the head of a lawn water sprinkler system which will reduce the time required to till a relatively small area and to trim around a water sprinkler head.

In addition to the various objects and advantages of the present invention described with some degree of specificity above it should be obvious that additional objects and advantages of the combination garden tiller and grass trimmer will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 2 is an exploded view of the combination garden tiller and grass trimmer for trimming around a lawn water sprinkler head illustrated in FIG. 1;

FIG. 4 is a view showing a replaceable portion of apparatus for trimming around a lawn sprinkler head.

Figure 1:
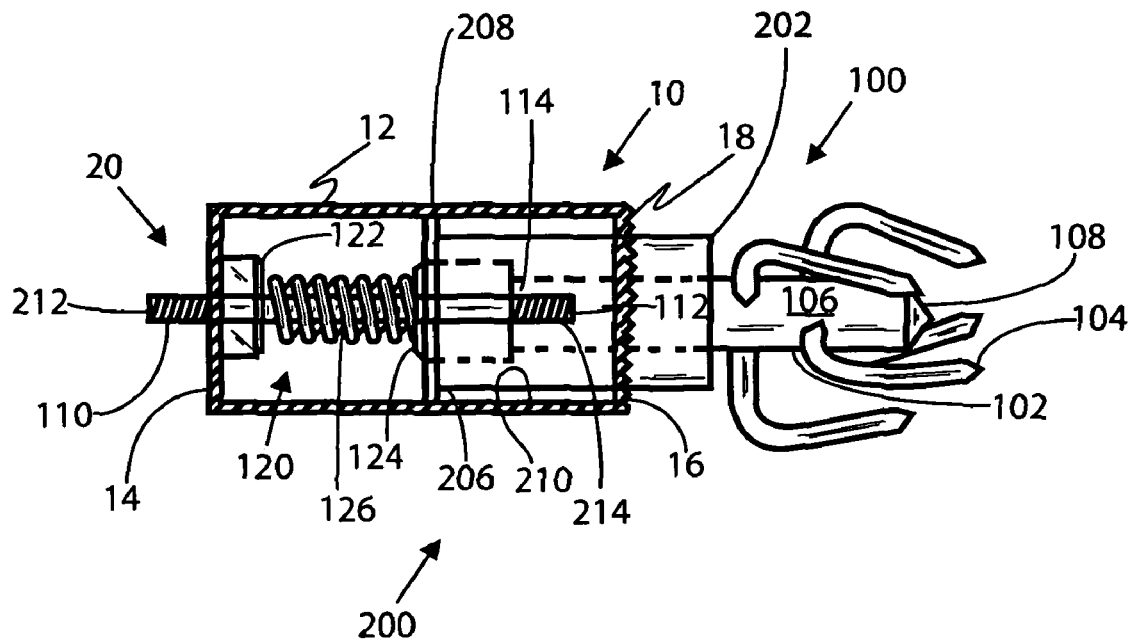
FIG. 1 is side elevation view showing the combination garden tiller and grass trimmer for trimming around a lawn water sprinkler head assembled as it would be used for tilling.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 3:
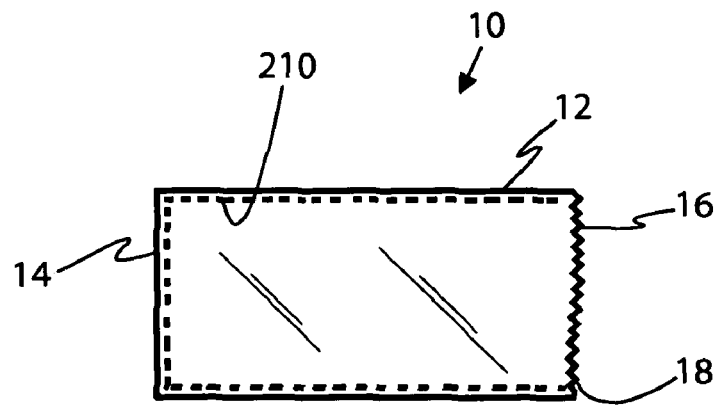
FIG. 3 is a side elevation view of the combination garden tiller and grass trimmer for trimming around a water sprinkler head illustrating the apparatus assembled for use as a grass trimmer for trimming around a lawn water sprinkler head.

Reference is now made, more particularly, to FIG. 3 of the drawings. Illustrated therein is a presently preferred embodiment of a grass trimming apparatus, generally designated 10, for trimming grass from around the head of a lawn water sprinkler (not shown).

Such apparatus 10 includes an elongated generally hollow tubular member 12 closed at a first end 14 thereof. The elongated generally hollow tubular member 12 having each of a predetermined length and a predetermined inside diameter which allows clearance around the head (not shown) of the lawn water sprinkler system (not shown). Preferably, such predetermined inside diameter is generally about 3.0 inches.

There is a plurality of serrations 16 formed on a second axially opposed end 18 of such elongated generally hollow tubular member 12 for cutting grass disposed around such head portion of such lawn water sprinkler system. In the most presently preferred embodiment of the invention such second axially opposed end 18 of such elongated generally hollow tubular member 12 is heat treated for hardening.

Additionally, there is a means, generally designated 20, engageable with said first closed end 14 of such elongated generally hollow tubular member 12 for manipulating the apparatus 10 for trimming such grass from around such head portion of such lawn water sprinkler system.

In the presently preferred embodiment of the invention, such means 20 engageable with the first closed end 14 of such elongated generally hollow tubular member 12 for manipulating the apparatus 10 for trimming such grass from around such head portion of such lawn sprinkler system is one of power driven and manually operated.

In the situation where such means 20 engageable with such first closed end 14 of such elongated generally hollow tubular member 12 for manipulating said apparatus for trimming such grass from around such head portion of such lawn sprinkler is manually operated a handle (not shown) will be provided.

On the other hand, in the situation where such means 20 engageable with such first closed end of the elongated generally hollow tubular member 12 for manipulating such apparatus 10 for trimming such grass from around such head portion of such lawn sprinkler is power driven a motor (not shown) will be provided. Such motor may be either electrically powered or gas powered.

Now reference is made, still more particularly, to FIG. 4 of the drawings. Illustrated therein is a replaceable portion 17 for the serrations 16 on the grass trimming apparatus 10. Such replaceable portion 17 is in the form of a band saw blade.

Reference is now made, more particularly, to FIG. 2. Illustrated therein is a presently preferred embodiment of an apparatus, generally designated 100 for at least one of tilling, weeding and cultivating a small garden area.

This apparatus 100 includes a first elongated rod like member 102 having each of a predetermined length and a first predetermined cross-sectional shape in a direction transverse to the predetermined length. Such first predetermined cross-sectional shape of the first elongated rod like member 102 will be selected from one of generally round, hexagonal and octagonal. In the most presently preferred embodiment of the invention this first predetermined cross-sectional shape of such first elongated rod like member 102 is generally round.

Another essential component of the apparatus 100 is a predetermined number of tine members 104 secured to an outer surface 106 of such first elongated rod like member 102 closely adjacent a first end 108 thereof for penetrating a ground surface (not shown) in order to at least one of till, weed and cultivate a small garden area, such as a flower garden.

In the presently preferred embodiment of the invention such predetermined number of tine members 104 is six. Additionally, each of such six tine members 104 will include a sharpen point. Preferably, such sharpened points will be heat treated to improve their hardness.

There is a second elongated rod like member 110 engageable at a first end 112 thereof with a second axially opposed end 114 of such first elongated rod like member 102.

A biasing means, generally designated 120, disposed over such second elongated rod like member 110 and caged between a pair of plate like members 122 and 124 for absorbing shock during use of such apparatus 100.

In the presently preferred embodiment of the invention such biasing means 120 is a spring 126. Preferable such spring 126 is a coil compression spring.

These is a means 130 engageable with a second end 128 of such second elongated rod like member 110 for manipulating the apparatus 100 during such at least one of tilling, weeding and cultivating a small garden area.

In the presently preferred embodiment such means 130 engageable with the second end 128 of such first elongated rod like member 110 for manipulating the apparatus 100 during at least one of tilling, weeding and cultivating a small garden area is one of power driven and manually operated.

Now refer, more particularly, to FIG. 1. Illustrated therein is an apparatus, generally designated 200, for at least one of trimming grass from around a head portion (not shown) of a lawn water sprinkler (not shown) and at least one of tilling, weeding and cultivating a small garden area. This apparatus 200 includes an elongated generally hollow tubular member 12 closed at a first end 14 thereof. Such elongated tubular member 12 having each of a predetermined length and a predetermined diameter.

A plurality of serrations 16 are formed on the second axially opposed end 18 of such elongated generally hollow tubular member 12 for cutting grass disposed around such head portion of such lawn water sprinkler.

There is an elongated generally hollow housing member 202 at least partially disposed for reciprocal movement within such elongated generally hollow tubular member 12. In this embodiment of the invention, such elongated generally hollow housing member 202 is open at a first end thereof and has each of a predetermined length and a predetermined cross-sectional shape in a direction transverse to such predetermined length.

A plate like means 204 disposed at a second end of such axially opposed second end 206 of such elongated generally hollow housing member 202 for closing such second end 206 of such elongated generally hollow housing member 202 and having an outer periphery 208 thereof engageable with an inner surface 210 of such elongated generally hollow tubular member 12 for providing a first portion of a guide means during such reciprocal movement.

A second portion of such guide means disposed around an outer periphery of such elongated generally hollow housing member 12 intermediate each end thereof and having an outer periphery engageable with such inner surface 210 of such elongated generally hollow tubular member 12 for providing a second portion of such guide means during such reciprocal movement.

A first elongated rod like member 102 having each of a predetermined length and a first predetermined cross-sectional shape in a direction transverse to such predetermined length.

A predetermined number of tine members 104 secured to an outer surface 106 of such first elongated rod like member 102 adjacent a first end 108 thereof for penetrating a ground surface to such at least one of till, weed and cultivate a small garden area;

A second elongated rod like member 110 engageable at a first end 112 thereof with a second axially opposed end 114 of such first elongated rod like member 102. A biasing means 120 disposed over such second elongated rod like member 110 and caged between a pair of plate like members 122 and 124 for absorbing shock during use of such apparatus 200.

A means engageable with one of such first closed end 14 of such elongated generally hollow tubular member 12 and the second end 212 of such second elongated rod like member 110 for manipulating such apparatus 200 for at least one of trimming such grass from around such head portion of such lawn sprinkler and at least one of tilling, weeding and cultivating a small garden area.

In the presently preferred embodiment of this embodiment of the invention such first elongated rod like member 102 includes a threaded aperture 214 in such second end 114 thereof and the first end 112 of such second elongated rod like member 110 is threaded for threadedly engaging such threaded aperture 214.

It is presently preferred that such tine members 104 are heat treated for hardening and such tine members 104 are secured to such outer surface 106 of the first elongated rod like member 102 adjacent said first end thereof by one of welding and brazing.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. An apparatus for trimming grass from around a head portion of a lawn water sprinkler, said apparatus comprising:
 (a) an elongated generally hollow tubular member closed at a first end thereof, said elongated tubular member having a predetermined length which is longer than a predetermined diameter thereof;
 (b) a plurality of serrations one of disposed on and formed on a second axially opposed end of said elongated generally hollow tubular member for cutting grass disposed around such head portion of such lawn water sprinkler;
 (c) an elongated generally hollow housing member at least partially disposed for reciprocal movement within said elongated generally hollow tubular member, said elongated generally hollow housing member is open at a first end thereof, said first end of said elongated generally hollow housing member extendable outwardly relative to said second end of said elongated generally hollow tubular member, said elongated generally hollow housing member having each of a predetermined length and a predetermined cross-sectional shape in a direction transverse to said predetermined length;
 (d) a guide plate disposed at an axially opposed second end of said elongated generally hollow housing member for closing said second end thereof, said plate having an outer periphery thereof engageable with an inner surface of said elongated generally hollow tubular member for providing a portion of a guiding structure during said reciprocal movement of said elongated generally hollow housing member;
 (e) an elongated member disposed axially within each of said elongated generally hollow tubular member and said elongated generally hollow tubular member and said elongated generally hollow housing member, said elongated member having each of a first threaded end thereof extending outwardly relative to said first end of said elongated generally hollow tubular member and axially opposed second threaded end thereof disposed within said elongated generally hollow housing member;
 (f) a first plate disposed within said elongated generally hollow tubular member in abutting engagement with said first end thereof;

(g) a second plate disposed within said elongated generally hollow tubular member in abutting engagement with said guiding plate;

(h) a biasing member disposed over said elongated member and caged between said first and second plates; and (i) means engageable with said first threaded end of said elongated member for manipulating said apparatus for trimming such grass from around such head portion of such lawn sprinkler.

2. An apparatus, according to claim 1, wherein said means engageable with said first threaded end of said elongated member for manipulating said apparatus for trimming such grass from around such head portion of such lawn sprinkler is one of power driven and manually operated.

3. An apparatus, according to claim 2, wherein said means engageable with said first threaded end of said elongated member for manipulating said apparatus for trimming such grass from around such head portion of such lawn sprinkler is manually operated by a handle.

4. An apparatus, according to claim 2, where said means engageable with said first threaded end of said elongated member for manipulating said apparatus for trimming such grass from around such head portion of such lawn sprinkler is power driven by a motor.

5. An apparatus, according to claim 1, wherein said second axially opposed end of said elongated generally hollow tubular member is heat treated for hardening.

6. An apparatus, according to claim 1, wherein said plurality of serrations are disposed on said second axially opposed end of said elongated generally hollow tubular member.

7. An apparatus, according to claim 6, wherein said plurality of serrations are formed on a band saw blade and said band saw blade is attached to said second axially opposed end of said elongated generally hollow tubular member.

* * * * *